US009244089B2

(12) United States Patent
Tsuge et al.

(10) Patent No.: US 9,244,089 B2
(45) Date of Patent: Jan. 26, 2016

(54) ROTATION DETECTING UNIT AND METHOD FOR MAKING THE SAME

(75) Inventors: Hiroyuki Tsuge, Nisshin (JP); Mitsuru Takasaki, Obu (JP)

(73) Assignee: DENSO CORPORATION, Kariya (JP)

( * ) Notice: Subject to any disclaimer, the term of this patent is extended or adjusted under 35 U.S.C. 154(b) by 472 days.

(21) Appl. No.: 13/611,360

(22) Filed: Sep. 12, 2012

(65) Prior Publication Data

US 2013/0106408 A1 May 2, 2013

(30) Foreign Application Priority Data

Oct. 28, 2011 (JP) ................. 2011-237662

(51) Int. Cl.
G01B 7/30 (2006.01)
G01P 3/487 (2006.01)
G01D 5/14 (2006.01)

(52) U.S. Cl.
CPC ............... G01P 3/487 (2013.01); G01D 5/145 (2013.01); *Y10T 29/49172* (2015.01)

(58) Field of Classification Search
CPC ......... G01D 5/145; G01D 5/147; G01D 5/20; G01D 5/14; G01D 5/202; G01D 5/206; G01D 5/2225; G01D 5/2208; G01R 33/022; G01R 33/06; G01R 33/02; G01B 7/003; G01B 7/004; G01B 7/14; G01B 7/028; G01B 7/30; G01B 11/26; G01B 13/18; G01B 21/22; H01L 43/06; G01P 3/66; H02K 11/31; H02K 11/15; H02K 29/06; H02K 29/12; G01L 3/105; G01L 1/127
USPC ............. 324/207.25, 207.22, 207.24, 207.23, 324/207.11, 200, 206, 245, 252, 67; 702/145, 147, 151, 163; 73/862.331, 73/862.326, 117.02
See application file for complete search history.

(56) References Cited

U.S. PATENT DOCUMENTS 6,157,186 A 12/2000 Aoki et al.
6,781,367 B2 * 8/2004 Sakanoue ............ G01D 11/245
324/174

(Continued)

FOREIGN PATENT DOCUMENTS

JP 11-014644 1/1999
JP 2001-141738 5/2001

(Continued)

OTHER PUBLICATIONS

Office action dated Oct. 8, 2013 in corresponding Japanese Application No. 2011-237662.

(Continued)

*Primary Examiner* — Tung X Nguyen
*Assistant Examiner* — Thang Le
(74) *Attorney, Agent, or Firm* — Harness, Dickey & Pierce, P.L.C.

(57) ABSTRACT

A rotation detecting unit is adapted for a rotatable body. The rotation detecting unit includes a rotation detecting part, a signal transmission member, and a main body part. The rotation detecting part detects a rotational state of the rotatable body and outputs a rotation detection signal. The signal transmission member is electrically connected to the rotation detecting part to transmit the rotation detection signal to an external device. The main body part holds at least a part of the signal transmission member and the rotation detecting part. The main body part is integrally molded from thermosetting resin including a joined part obtained as a result of joining together a terminal of the rotation detecting part and the signal transmission member, the part of the signal transmission member, and the rotation detecting part. The main body part includes a recess at a region corresponding to the rotation detecting part.

14 Claims, 7 Drawing Sheets

(56) References Cited

U.S. PATENT DOCUMENTS

| | | | |
|---|---|---|---|
| 6,879,151 B2* | 4/2005 | Iwase | G01D 11/245 |
| | | | 324/207.25 |
| 7,190,160 B2* | 3/2007 | Hattori | G01P 1/026 |
| | | | 324/207.25 |
| 8,368,388 B2* | 2/2013 | Lohberg et al. | 324/174 |
| 2002/0196014 A1* | 12/2002 | Iwase et al. | 324/207.2 |
| 2005/0126308 A1 | 6/2005 | Tsuge et al. | |
| 2006/0169059 A1* | 8/2006 | Kawasaki | G01P 1/026 |
| | | | 73/862.08 |
| 2007/0001664 A1* | 1/2007 | Steinbrink et al. | 324/174 |
| 2008/0204007 A1* | 8/2008 | Kim et al. | 324/207.25 |
| 2010/0040315 A1* | 2/2010 | Ozaki et al. | 384/446 |
| 2010/0207295 A1* | 8/2010 | Goetz et al. | 264/272.11 |

FOREIGN PATENT DOCUMENTS

| | | |
|---|---|---|
| JP | 2002-137248 | 5/2002 |
| JP | 2005-172573 | 6/2005 |
| JP | 2005-227095 | 8/2005 |

OTHER PUBLICATIONS (First) Office Action dated Apr. 3, 2014 in corresponding Chinese Application No. 2012-10414224.8.
(Second) Office Action dated Dec. 9, 2014 in corresponding Chinese Application No. 2012-10414224.8.
Office Action dated Jun. 10, 2015 in corresponding Chinese Application No. 2012-10414224.8.

* cited by examiner

ROTATION DETECTING UNIT AND METHOD FOR MAKING THE SAME

CROSS REFERENCE TO RELATED APPLICATION

This application is based on Japanese Patent Application No. 2011-237662 filed on Oct. 28, 2011, the disclosure of which is incorporated herein by reference.

TECHNICAL FIELD

The present disclosure relates to a rotation detecting unit including at least a rotation detecting part, a signal transmission member; and a main body portion, and a method for making the rotation detecting unit.

BACKGROUND

Conventionally, an example of a technology related to a rotation detecting unit which can deal with increase in the types of integrated circuits (IC) for rotation detection at low cost is widely known (see, for example, JP-A-2005-172573 corresponding to US2005/0126308A1). This rotation detecting unit includes a shape adjustment part, which is molded from resin to cover a rotation detecting part, to conform a shape of a rotation detecting part to an internal shape of a housing.

Moreover, an example of a technology related to a magnetism quantity variation sensor for improving accuracy of a position of a magnetoelectric transducer at the time of covering of resin molding is widely known (see, for example, JP-A-2005-227095). According to this magnetism quantity variation sensor, there are at least two positions at which a lead terminal in a shape of a linear plate piece is engaged with a holder of the magnetoelectric transducer, and a thickness direction and width direction of the lead terminal are positioned respectively at two places or more. Then, all of these are covered with resin molding.

However, according to the technology described in JP-A-2005-172573, low-pressure molding (hot melt) for protecting the IC and the joint region from a molding pressure of the main body, after joining together a wire and IC by welding to form a main body part is necessary. In addition, the housing is necessary as a component for the positioning fixing of the IC and a seal of the main body. Because polybutylene terephthalate (PBT) which is a thermoplastic resin is used for the main body resin, there is no adhesive strength with respect to a core wire. For this reason, forming is required for the wire part to secure wire fixing force and to absorb displacement at the time of molding. Accordingly, a size of the rotation detecting unit cannot be reduced.

According to the technology described in JP-A-2005-227095, all of these are covered with resin molding with the lead terminal engaged with the holder of the magnetoelectric transducer. Thus, the magnetism quantity variation sensor has such a size that includes the holder. Accordingly, the size of the entire magnetism quantity variation sensor cannot be made smaller than the size of the holder.

SUMMARY

According to the present disclosure, there is provided a rotation detecting unit adapted for a rotatable body. The rotation detecting unit includes a rotation detecting part, a signal transmission member, and a main body part. The rotation detecting part is configured to detect a rotational state of the rotatable body and to output a rotation detection, signal. The signal transmission member is electrically connected to the rotation detecting part to transmit the rotation detection signal to an external device. The main body part holds at least a part of the signal transmission member and the rotation detecting part. The main body part is integrally formed from thermosetting resin including a joined part obtained as a result of joining together a terminal of the rotation detecting part and the signal transmission member, the part of the signal transmission member, and the rotation detecting part. The main body part includes a recess at a region corresponding to the rotation detecting part.

According to the present disclosure, there is also provided a method for making a rotation detecting unit. The rotation detecting unit includes a rotation detecting part, a signal transmission member, a main body part, and an attachment part. The rotation detecting part is configured to detect a rotational state of a rotatable body and to output a rotation detection signal. The signal transmission member is electrically connected to the rotation detecting part to transmit the rotation detection signal to an external device. The main body part holds at least a part of the signal transmission member and the rotation detecting part. The attachment part is for attachment of the main body part to an attached body. According to the method, a joining process is performed. In the joining process, a terminal of the rotation detecting part and the signal transmission member are joined together. Furthermore, a main body part forming process is performed. In the main body part forming process, at least a joined part, at which the terminal and the signal transmission member are joined together in the joining process, the part of the signal transmission member, and the rotation detecting part are integrally-formed from thermosetting resin, thereby to form the main body part.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
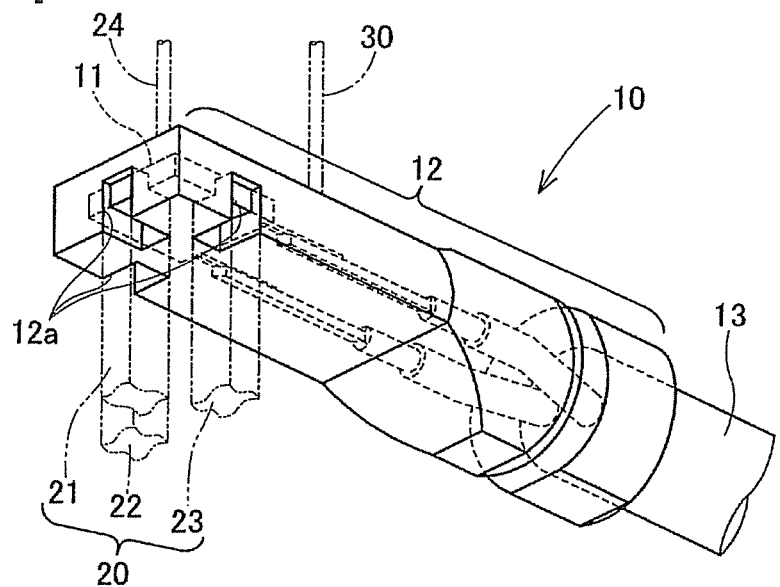
FIG. 1 is a perspective view schematically illustrating a configuration of a rotation detecting unit which is gazed up from underneath in accordance with a first embodiment.

Embodiments will be described below with reference to the accompanying drawings. Unless otherwise stated, a "connection" means an electrical connection. Each drawing illustrates components which are necessary to describe the embodiments, and does not show all the actual components. Directions such as right, left, up and down are referred to based on depiction of the drawings.

First Embodiment

A first embodiment will be described with reference to FIGS. 1 to 7B. A rotation detecting unit 10 having a configuration illustrated in FIG. 1 includes a rotation detecting part 11, a main body part 12, a signal transmission member 13, and an attachment part 14 provided if needed (see FIGS. 7A and 7B). For convenience of the explanation, a surface close to a sensor element 11a provided in the rotation detecting part 11 is referred to as a "front face", and a surface that is opposed to the front face and is away from the sensor element 11a is referred to as a "rear face".

The main body part 12 illustrated in FIG. 1 is formed by a molding machine as described in greater detail hereinafter. Any molding machine may be employed as long as the main body part 12 can be integrally molded. For example, an injection molding machine or a compression molding machine may be used for the molding machine. On the main body part 12, more than one (three in the example of FIG. 1) recess 12a are formed so as to straddle two surfaces or more (two surfaces of the rear face and a side face in the example in FIG. 1). More specifically, the recesses 12a are vestiges of a holding member group 20 which has been holding the rotation detecting part 11 at the time of integral moulding of the main body part 12 from thermosetting resin by the molding machine (holding members 21, 22, 23, and 24 indicated by alternate long and two short dashes lines in the example in FIG. 1). A relationship between the recess 12a and the rotation detecting part 11 will be described in greater detail hereinafter. Example of a specific configuration of the holding member group 20 will also be described in greater detail hereinafter (see FIGS. 5A to 5D). A runner part 30 is a region through which thermosetting resin is injected into a mold form at the time of formation of the main body part 12. The holding member group 20 and the runner part 30 are normally provided for the molding machine. Alternatively, they may be provided separately from the molding machine. Positions and quantity of these holding member group 20 and runner part 30 are set appropriately in accordance with, for example, the intended shape of the main body part 12 or a material of thermosetting resin. In the present embodiment, epoxy resin (EP) is used as the thermosetting resin.

A surface of the rotation detecting part 11 is exposed to the recess 12a, or EP exists between the recess 12a and the surface of the rotation detecting part 11. This is changed according to a relationship among hardness of the surface of the rotation detecting part 11, a pressure applied by the holding member group 20 when the group 20 holds the rotation detecting part 11 (hereinafter referred to simply as a "holding pressure"), and a pressure of EP injected from the runner part 30 (hereinafter referred to simply as a "resin pressure"). In the case of (holding pressure) (resin pressure), the surface of the rotation detecting part 11 is exposed. In the case of (holding pressure)<(resin pressure), EP exists between the recess 12a and the surface of the rotation detecting part 11, and a thickness of EP depends on a difference between both the pressures. In other words, in accordance with a relative relationship between the hardness of the surface of the rotation detecting part 11 and the holding pressure, or the magnitude of the resin pressure, the surface of the rotation detecting part 11 is exposed, or EP exists between the recess 12a and the surface of the rotation detecting part 11 and the thickness of EP changes. Realistically, there may be a clearance between the rotation detecting part 11 and the holding member groups 20, or shapes of respective contact surfaces between the rotation detecting part 11 and the holding member group 20 may be different. Accordingly, EP easily exists between the recess 12a and the surface of the rotation detecting part 11. In order to secure sealing properties, in the case of the surface of the rotation detecting part 11 being exposed, a lead frame, a signal line connected to the inside and so forth may not exist at the exposed region of the recess 12a.

Figure 2A:
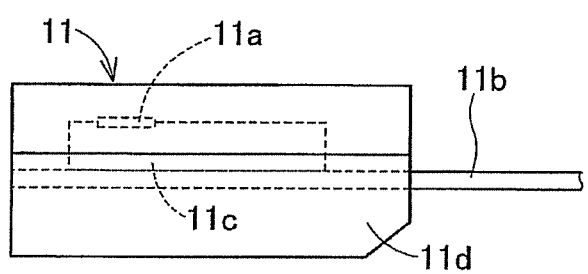
FIG. 2A is a side view schematically illustrating the configuration of the rotation detecting unit of the first embodiment.
Figure 2B:
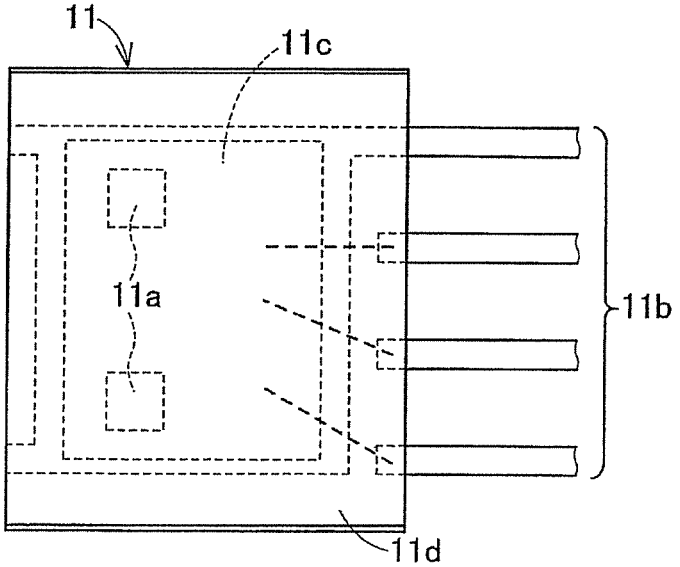
FIG. 2B is a front view or plan view schematically illustrating the configuration of the rotation detecting unit of the first embodiment.

The rotation detecting part 11 illustrated in FIGS. 2A and 2B is a signal processing component obtained by integrally molding a processing circuit body 11c including a semiconductor chip with a sealing body 11d. The sealing body 11d is mainly resin, regardless of the types of resin such as thermosetting resin or thermoplastic resin. A lead frame 11b that detects at least a rotational state of a rotatable body to be capable of outputting a rotation detection signal is provided for the rotation detecting part 11. More specifically, in the example of the configuration of the detecting part 11 in FIG. 2B, the four lead frames 11b are provided on one surface. Two lead, frames 11b of the four lead frames that are not involved in the connection to the signal transmission member 13 are not shown in FIG. 2A. A lead wire, contact pin, terminal and so forth may be provided instead of (or using in combination with) the lead frame 11b. As long as it is a rotatable object, any rotatable body may be used for the rotatable body. For example, in addition to hub bearings (see FIG. 7A) described in greater detail hereinafter, a wheel, and a rotating electrical machine (specifically, a generator, electric motor, motor generator and so forth) may be employed for the rotatable body.

The rotation detecting part 11 having the configuration illustrated in FIGS. 2A and 2B integrally includes the sensor element 11a on one surface (upper surface, front face) side of the processing circuit body 11c. Accordingly, the upper surface side in FIG. 2A is a front face side, and the lower surface side in FIG. 2A is a rear face side. The sensor element 11a is a sensor that detects the rotational state of, the rotatable body. For example, a magnetometric sensor may be used for the rotatable body including a magnetic encoder.

The production method for the rotation detecting unit 10 will be described with reference to FIGS. 3A to 7B. The production method of the rotation detecting unit 10 includes a joining process, a main body part molding process, and an attachment part molding process. A concrete example of each process will be explained below.

Figure 3A:
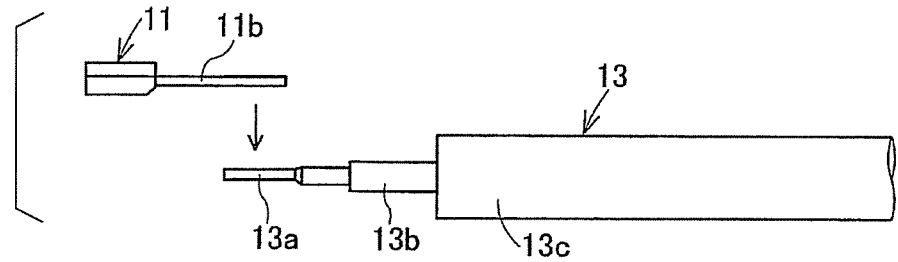
FIG. 3A is a diagram illustrating a joining process according to the first embodiment.
Figure 3B:
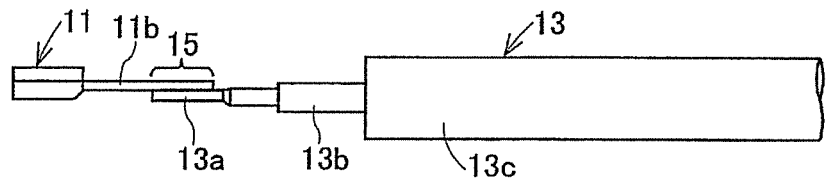
FIG. 3B is a side view illustrating a state after the joining according to the first embodiment.

In the joining process, joining between the lead frame 11b of the rotation detecting part 11 and the signal transmission member 13 is performed. The signal transmission member 13 is, arbitrary as long as it is a member that can transmit at least the rotation detection signal outputted from the rotation detecting part 11 (specifically, the lead frame 11b) to an external device. The external device is a device which processes the rotation detection signal. For example, an electronic control unit (ECU) or computer may be employed for the external device. The signal transmission member 13 of the present embodiment is an example of an electric wire. Specifically, as illustrated in FIG. 3A, a front end portion 13a of an electric conductor is covered with an insulating coating member 13b. The shape of the front end portion 13a is arbitrary. Thin lines (core wires) are twisted together and then welded (e.g., resistance welding or ultrasonic welding) to facilitate its joining with the lead frame 11b. As a result, the front end portion 13a of the present embodiment is formed in the shape of a flat plate. Furthermore, more than one (two in the present embodiment) insulating coating member 13b are bundled together, and all of the coating members 13b are covered with the insulating coating member 13c. Although not shown, a shielding wire may be provided between the insulating coating member 13b and the insulating coating member 13c to limit an influence of such as an extraneous noise on the rotation detection signal.

Figure 3C:
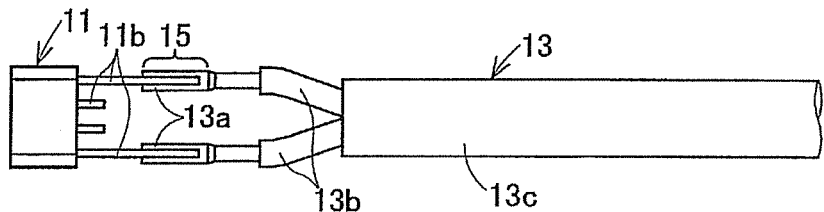
FIG. 3C is a front view or plan view illustrating the state after the joining according to the first embodiment.

In the above-described joining process by the signal transmission member 13, as illustrated in FIG. 3A, the lead frame 11b and the front end, portion 13a are brought relatively close to and in contact with each other, and the frame 11b and the portion 13a are joined together in their contact state. For example, welding or soldering may be employed for the joining. In addition, since the purpose of the above joining is an electric connection, connection methods other than the joining (for instance, an electric conduction line may be wound around the lead frame 11b and the front end portion 13a, or the lead frame 11b and the front end portion 13a may be twisted together) may be used. In FIG. 3C, regions of the lead frame 11b and the front end portion 13a on which their joining is performed are indicated by a joined part 15. After the lead frame 11b and the front end portion 13a are joined together, because the rotation detecting part 11 is light, a state (position) illustrated in FIGS. 3B and 3C can be maintained as long as external force is not applied to the detecting part 11.

Figure 4:
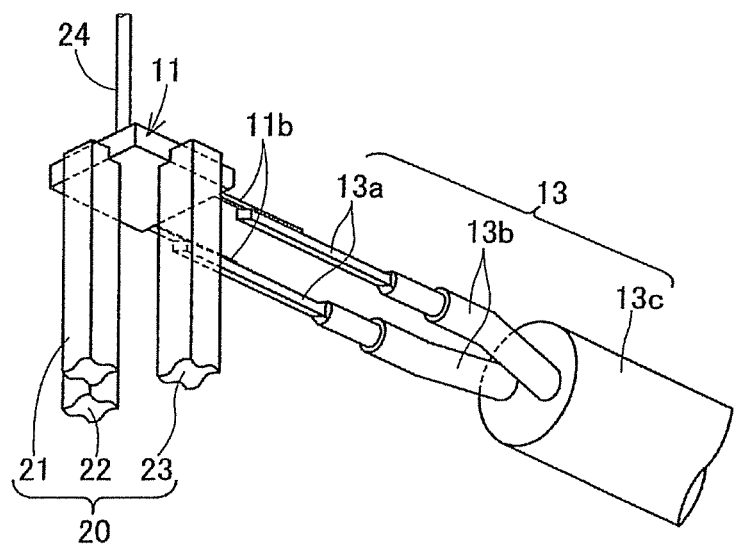
FIG. 4 is a perspective view schematically illustrating the state after the joining according to the first embodiment.

Before performing the integral moulding by the molding machine in the main body part molding process, the rotation detecting part 11 is positioned in conformity to the shape of the main body part 12. As illustrated in FIG. 4, the holding member group 20 is used for this positioning. The holding member group 20 includes more than one holding member. In the example in FIG. 4, four holding members 21, 22, 23, 24 are used. The holding members 21, 22, 23, 24 constitute the holding member group 20. Among these members, the holding members 21, 22, 23 are formed in shapes that can be simultaneously in contact with two surfaces or more of the surface of the rotation detecting part 11 (the rear face and side face in the present embodiment). The holding member 24 is formed in a shape (e.g., cylindrical shape or polygonal column shape) that can press one surface of the rotation detecting part 11 (front face in the present embodiment). Because the holding members 21, 22, 23 are formed in the identical shape, the holding member 21 will be described below as a representative of the members 21, 22, 23.

Figure 5A:
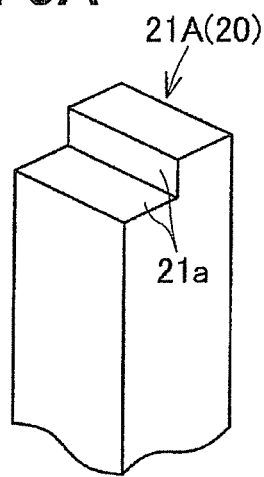
FIG. 5A is a perspective view schematically illustrating a shape of a holding member in the example of holding a rotation detecting part in FIG. 4.
Figure 5B:
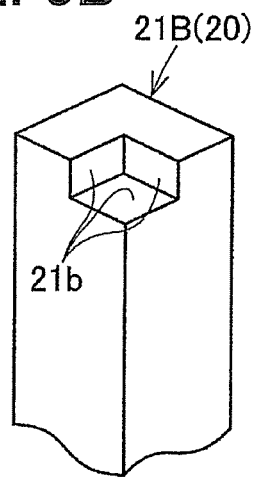
FIG. 5B is a perspective view schematically illustrating an example of the shape of the holding member according to the first embodiment.
Figure 5C:
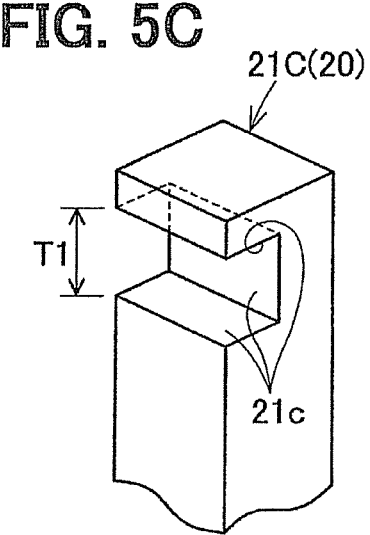
FIG. 5C is a perspective view schematically illustrating an example of the shape of the holding member according to the first embodiment.
Figure 5D:
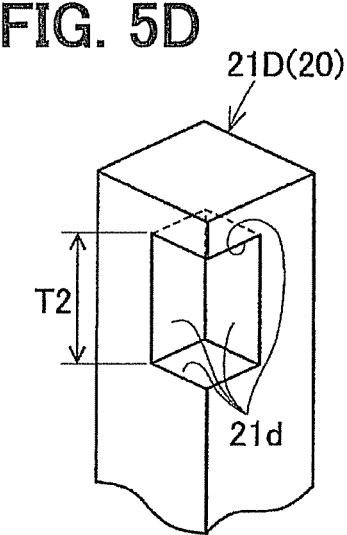
FIG. 5D is a perspective view schematically illustrating an example of the shape of the holding member according to the first embodiment.

The holding member 21A in FIG. 5A includes a contact surface 21a that can be simultaneously in contact with two surfaces of the rotation detecting part 11. The rotation detecting part 11 is held in two directions by the one holding member 21A. Accordingly, three or more holding members 21A may be necessary to reliably hold the rotation detecting part 11, and thus the accuracy of the position of the detecting part 11 at the main body part 12 can be secured.

Instead of the shape of the holding member 21A in FIG. 5A, a holding member having another shape may be used. For example, holding members 21B, 21C, 21D having shapes respectively in FIGS. 5B, 5C, 5D may be employed. The holding member 21B in FIG. 5B includes a contact surface 21b that can be simultaneously in contact with a corner part (three surfaces) of the rotation detecting part 11. The one holding member 21B holds the rotation detecting part 11 in two directions. Accordingly, three or more holding members 21B may be necessary to reliably hold the rotation detecting part 11. The holding member 21C in FIG. 5C includes a contact surface 21c that can be in contact simultaneously with three surfaces (the front face, side face and rear face, or three adjacent side surfaces) of the rotation detecting part 11 to clamp the three surfaces of the detecting part 11. The one holding member 21C holds the rotation detecting part 11 in three directions. Accordingly, three or more holding members 21C may be necessary to reliably hold the rotation detecting part 11. The holding member 21D illustrated in FIG. 5D includes a contact surface 21d that can be in contact simultaneously with two adjacent corner parts (four surfaces) of the rotation detecting part 11 to clamp the four surfaces of the detecting part 11. The one holding member 21D holds the rotation detecting part 11 in four directions. Accordingly, two or more holding members 21D may be necessary to reliably hold the rotation detecting part 11. A gap T1 in FIG. 5C and a gap T2 in FIG. 5D both correspond to any one of thickness, longitudinal length, and lateral length of the rotation detecting part 11. By any shape of the holding members 21A, 21B, 21C, 21D, the accuracy of the position of the detecting part 11 at the main body part 12 can be secured. By means of the holding member 21C or the holding member 21D, the rotation detecting part 11 is clamped in the vertical direction of the drawings. Accordingly, the accuracy of the position of the detecting part 11 at the main body part 12 can be improved.

In the main body part molding process, the integral moulding from EP is carried out including at least the joined part 15 which is joined through the above-described joining process, a part of the signal transmission member 13, and the rotation detecting part 11, thereby to form the main body part 12. As illustrated in FIG. 4, the integral moulding by the molding machine is performed with the rotation detecting part 11 held by the holding member group 20. Illustration and explanation of the integral moulding by the molding machine are omitted because it is widely known. The integral moulding using EP has adhesive strength, so that sealing properties of the rotation detecting part 11 and the signal transmission member 13 can be ensured. After the integral moulding, the runner part 30 and the holding member group 20 are removed, and a state of the unit 10 after their removal is illustrated in FIGS. 6A to 6D.

An example of a configuration of the main body part 12, which has been integrally formed through the main body part molding process, is shown in FIGS. 6A to 6D. The main body part 12 illustrated in FIG. 6A includes an attached region 12b at a position away from the sealed rotation detecting part 11. The attached region 12b is a region with which the attachment part 14 is integrally formed through the attachment part molding process which is described in greater detail hereinafter. Part of a cross-section of the attached region 12b (i.e., cross-sectional shape of an outer peripheral surface of the region 12b) is formed in a circle (i.e., more than one circular arc) (see FIGS. 6A to 6D and FIG. 7B). Furthermore, the main body part 12 includes a recess 12c on the attached region 12b. This recess 12c has a retaining function. More specifically, after the attachment part 14 is integrally formed through the attachment, part molding process, the recess 12c limits a movement of the attachment part 14 in a predetermined direction (horizontal (right and left) direction in FIG. 6A).

Figure 6A:
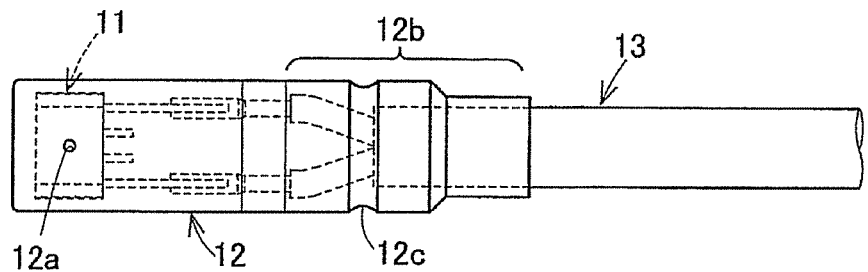
FIG. 6A is a front view schematically illustrating a configuration of a main body part formed by injection molding according to the first embodiment.
Figure 6B:
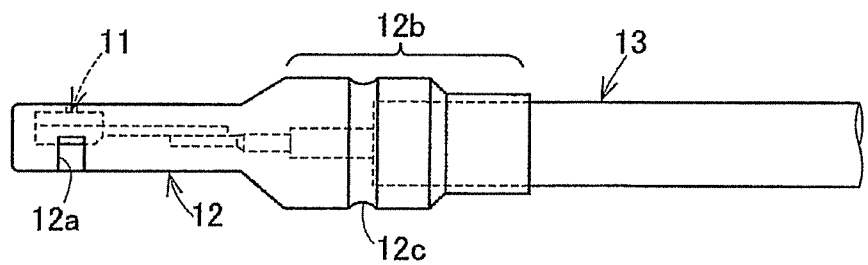
FIG. 6B is a side view schematically showing an example of the configuration of the main body part formed by injection molding according to the first embodiment.

A region of the main body part 12 illustrated in FIG. 6B except the attached region 12b is formed into a rectangular parallelepiped shape which is smaller than a diameter and width of the attached region 12b. An upper side in FIG. 6B is a front face side, and a lower side in FIG. 6B is a rear face side. Based on a correspondence relationship with FIG. 2A, the sensor element 11a is disposed on the front face side. The recess 12a, which is a vestige of the holding member 24, is formed on the rear face side, and the recesses 12a which are vestiges of the holding members 21, 22, 23 are formed astraddle from the rear face side to the side face side. In addition, the recess 12a that is in accordance with the shape of the holding member used is formed.

In the attachment part molding process, the integral moulding is performed from thermoplastic resin to cover both of a part of the main body part 12 formed in the above-described main body part molding process and a part of the signal transmission member 13, thereby to form the attachment part 14. In the present embodiment, polybutylene terephthalate (PBT) is used for thermoplastic resin. With the main body part 12 held by a holding member (not shown) which is separate from the holding member group 20, the integral moulding by the molding machine is performed. At the time of integral moulding, a corresponding surface (outer peripheral surface) of the main body part 12 is melted to be formed integrally with the attachment part 14. A material of the attachment part 14 may be PBT, or may also be EP similar to the main body part 12. When integral moulding is performed by a processing machine other than the molding machine, a material other than resin (e.g., metal or carbon fiber) may be used.

Figure 7A:
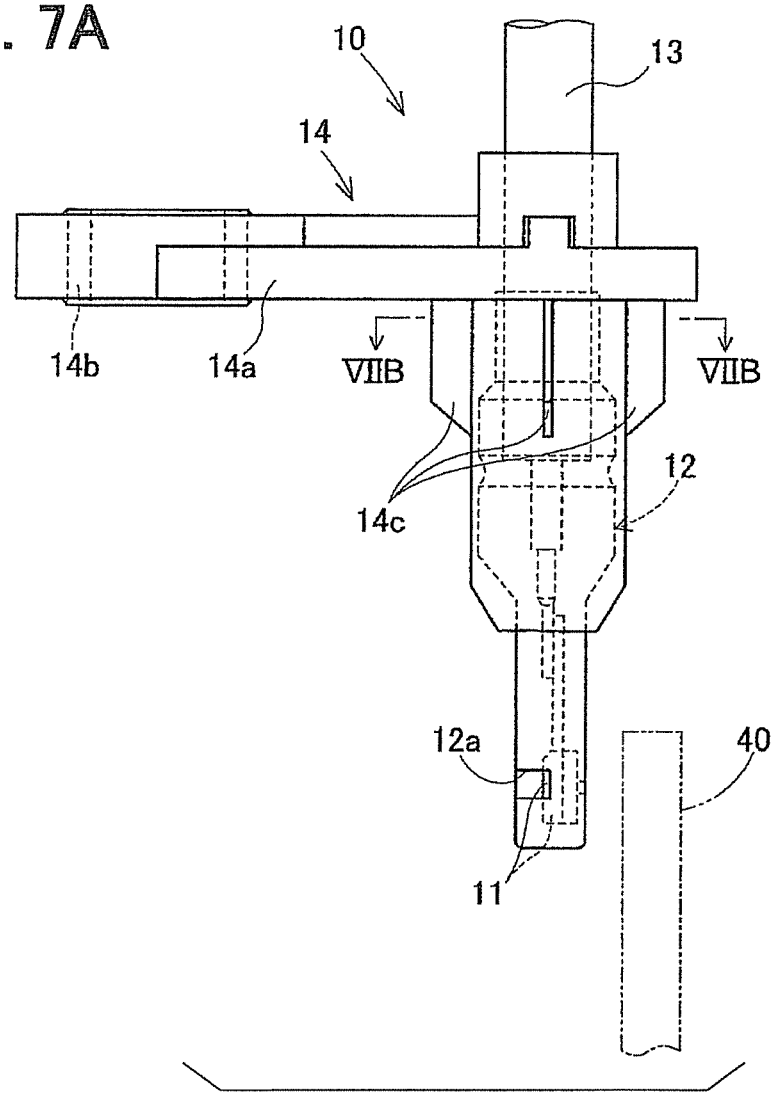
FIG. 7A is a side view schematically illustrating a configuration of an attachment portion according to the first embodiment.
Figure 7B:
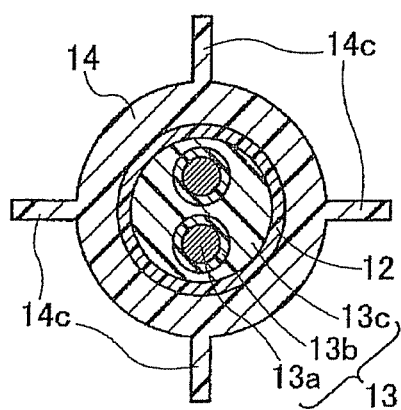
FIG. 7B is a cross-sectional view taken along a line VIIB-VIIB in FIG. 7A.

The state of the unit 10 after the integral formation is illustrated in FIGS. 7A and 7B. In FIG. 7A, a rotatable body 40 that is an object whose rotational state is detected by the sensor element 11a (see FIG. 2A) provided for the rotation detecting part 11 is indicated by an alternate long and two short dashes line. In the present embodiment, the magnetic encoder provided for the hub bearings as the rotatable body 40 is used. In this case, the magnetometric sensor is used as the sensor element 11a.

The attachment part 14 schematically illustrated in FIG. 7A is referred to also as a "stay", and as illustrated, the attachment part 14 is formed to cover both a part of the main body part 12 and a part of the signal transmission member 13. This attachment part 14 includes an attachment bush 14b and end pieces 14c provided for an attachment part main body 14a. A metal member that includes a hole for fixing the rotation detecting unit 10 itself to an attached body (e.g., frame) is mainly used for the attachment bush 14b. The end pieces 14c limits the position of the rotation detecting unit 10 itself such that the unit 10 can detect the rotational state of the rotatable body 40. More specifically, the rotation detecting unit 10 is arranged by the end pieces 14c such that the rotation detecting part 11 (specifically, the sensor element 11a) and the rotatable body 40 (specifically, a detected body) are opposed to each other. The recess 12a formed at the main body part 12 is formed at the position of a region corresponding to the rotation detecting part 11 away from the rotatable body 40. In other words, the sensor element 11a in the rotation detecting part 11 is held to be deviated from the center of the signal transmission member 13 toward the rotatable body 40.

As a result of the above-described first embodiment, the following effects can be produced. In the rotation detecting unit 10, after the lead frame 11b of the rotation detecting part 11 and the signal transmission member 13 are joined together, the main body part 12 is integrally molded from EP (thermosetting resin) with at least the joined part 15, where the frame 11b and the member 13 are joined, a part of the signal transmission member 13, and the rotation detecting part 11 being included in the integral moulding. The main body part 12 includes the recess 12a on the region corresponding to the rotation detecting part 11 (see, for example, FIGS. 1 and 6A to 6D). As a result of this configuration, integral moulding is performed using EP with at least a part of the signal transmission member 13 and the rotation detecting part 11 included in the integral moulding without forming or a holder. Accordingly, the size of the entire rotation detecting unit 10 (particularly, the main body part 12) can be limited to be comparatively small. Since EP has adhesive property, adhesive joining with the signal transmission member 13 and the rotation detecting part 11 can be carried out reliably, and the sealing properties and fixing force can be ensured. The recess 12a formed at the main body part 12 is a vestige of the holding member group 20 (holding member) that holds the rotation detecting part 11 when performing integral moulding using EP. In other words, because the rotation detecting part 11 is held by the holding member group 20 at the time of integral moulding, the accuracy of the position of the detecting part 11 in the main body part 12 can be secured.

Figure 6C:
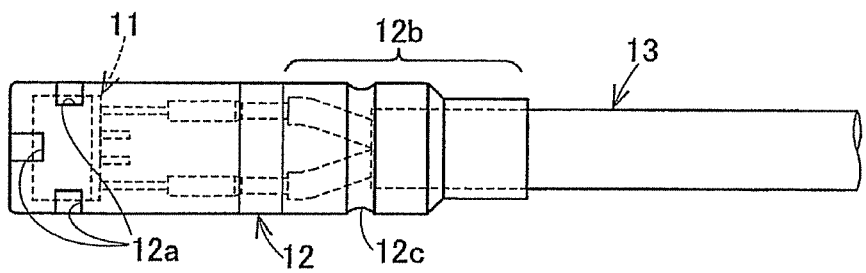
FIG. 6C is a back side view schematically showing an example of the configuration of the main body part formed by injection molding according to the first embodiment.
Figure 6D:
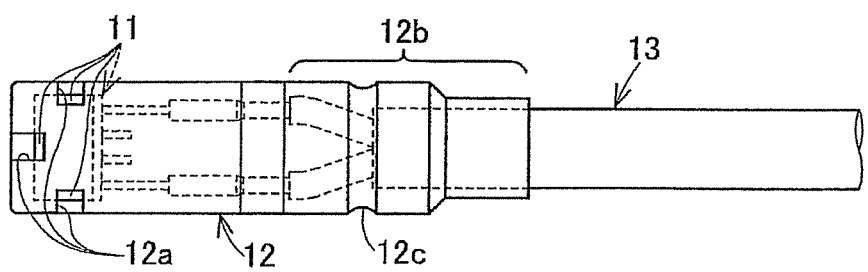
FIG. 6D is a back side view schematically showing an example of the configuration of the main body part formed by injection molding according to the first embodiment.

The surface of the rotation detecting part 11 is exposed to the recess 12a (see FIG. 6D) or EP exists between the recess 12a and the surface of the rotation detecting part 11 (see FIG. 6C). As a result of this configuration, sealing properties of the signal transmission member 13 and the rotation detecting part 11 are securable by the adhesive strength of EP.

The recess 12a is formed to straddle at least two surfaces of the surface of the rotation detecting part 11 (see FIG. 1). As a result of this configuration, the one holding member group 20 holds the rotation detecting part 11 from at least two directions. Accordingly, the accuracy of the position of the detecting part 11 in the main body part 12 can be secured by the simple configuration.

The recess 12a is formed at the position of the region corresponding to the rotation detecting part 11 away from the rotatable body 40 (see FIGS. 1, 7A and 7B). As a result of this configuration, the main body part 12 on the recess 12a-side is formed to be thicker than a thickness of the main body part 12 near the rotatable body 40. Accordingly, physical characteristics (particularly rigidity) that are necessary for the main body part 12 can be ensured.

The rotation detecting part 11 includes the sensor element 11a which detects the rotational state of the rotatable body 40, and the signal processing component which processes the signal detected by the sensor element 11a to output the rotation detection signal. The signal processing component includes at least the processing circuit body 11*c* and the sealing body 11*d*. The main body part 12 is molded integrally with the sealing body 11*d*, so that the main body part 12 holds the processing circuit body 11*c* (see FIGS. 2A and 2B). As a result of this configuration, because the processing circuit body 11*c* is molded integrally with the sealing body 11*d*, accuracy of the position of the signal processing component can be ensured, and sealing properties of the signal processing component can be improved.

The unit 10 includes the attachment part 14 which attaches the main body part 12 (see FIG. 7A). As a result of this configuration, the main body part 12 (eventually, the rotation detecting unit 10) can be easily attached to the attached body.

The attachment part 14 is molded integrally from PBT (thermoplastic resin) to cover both of a part of the main body part 12 and a part of the signal transmission member 13 (see FIGS. 7A and 7B). As a result of this configuration, the integral moulding is performed using PBT so that the attachment part 14 can easily be molded into the intended shape. In addition, the integral moulding may be performed to cover at least one of a part or all of the main body part 12, and a part or all of the signal transmission member 13 using PBT. Accordingly, similar operation and its effects can be produced.

A part of the cross-sectional surface (cross-sectional shape of an outer peripheral surface) of the main body part 12 at which the attachment portion 14 is integrally molded, is formed in a circle (i.e., more than one circular arc) (see FIGS. 6A to 6D, 7A and 7B). As a result of this configuration, a rotation preventing function of the main body part 12 can be obtained. Even in a case where a part or all of the cross-sectional surface is formed in an ellipse, although not shown, the rotation of the main body part 12 can be prevented. In the case of all of the cross-sectional surface being formed in a circle, the main body part 12 can be formed evenly in all directions.

The production method of the rotation detecting unit 10 includes the joining process (see FIGS. 3A to 3C) for joining together the lead frame 11*b* of the rotation detecting part 11 and the signal transmission member 13; and the main body part molding process (see FIGS. 4, and 6A to 6D) in which the integral moulding from EP is carried out including at least the joined part 15 which is joined through the joining process, a part of the signal transmission member 13, and the rotation detecting part 11 thereby to form the main body part 12. As a result of this configuration, the size of the entire rotation detecting unit 10 (particularly, the main body part 12) can be limited to be comparatively small. Since EP has adhesive property, adhesive joining with the signal transmission member 13 and the rotation detecting part 11 can be carried out reliably, and the sealing properties and fixing force can be ensured. Moreover, because the rotation detecting part 11 is held by the holding member group 20 at the time of integral moulding, the accuracy of the position of the detecting part 11 in the main body part 12 can be secured.

The production method includes the attachment part molding process in which the attachment part 14 is formed through the integral moulding from PBT to cover one or both of a part of the main body part 12 and a part of the signal transmission member 13 (see FIGS. 7A and 7B). As a result of this configuration, only by further performing the attachment part molding process, the rotation detecting unit 10 which has the attachment part 14 can be produced.

Second Embodiment

Figure 8:
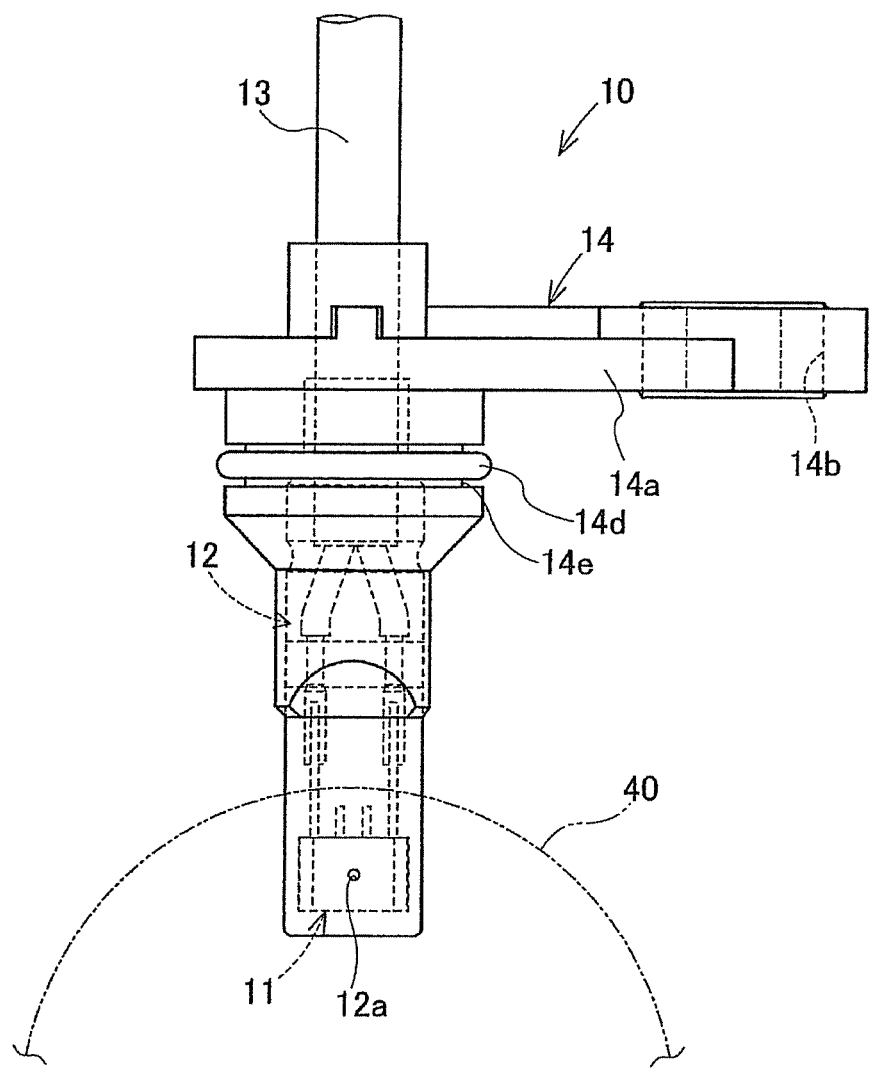
FIG. 8 is a side view schematically illustrating a configuration of a rotation detecting unit in accordance with a second embodiment.

A second embodiment will be described in reference to FIG. 8. A configuration of a rotation detecting unit 10 and so forth are similar to the first embodiment, and in order to simplify the illustration and explanation, in the second embodiment, points different from the first embodiment will be described. Therefore, for the same component as the component used in the first embodiment, its corresponding numeral is used to omit the explanation.

The second embodiment is different from the first embodiment in a configuration of an attachment part 14. An example of the configuration of the attachment part 14 instead of FIG. 7A is illustrated in a front view of FIG. 8. The attachment part 14 illustrated in FIG. 8 includes an attachment bush 14*b* and a recess 14*e* provided for an attachment part main body 14*a*. In other words, the recess 14*e* is provided instead of the end pieces 14*c*. This recess 14*e* is formed on an outer peripheral surface of the region of the attachment part 14 whose entire cross-sectional surface is formed in a circle so that an O-ring 14*d* can be fitted in the recess 14*e*. In the example of the configuration in FIG. 8, the attachment part main body 14*a* is formed such that the position of the attachment bush 14*b* is shifted (rotated) by 90 degrees as compared with FIG. 7A. As a result of this configuration, only the configuration of the attachment part 14 is different. Accordingly, similar operation and its effects to the first embodiment can be obtained.

Modifications of the above embodiments will be described. In the above description, there has been provided the disclosure based on the first and second embodiments. However, the present disclosure is not limited to these embodiments. In other words, the disclosure can be implemented in various modes without departing from the scope of the disclosure. For example, the following modes may be realized.

Figure 9:
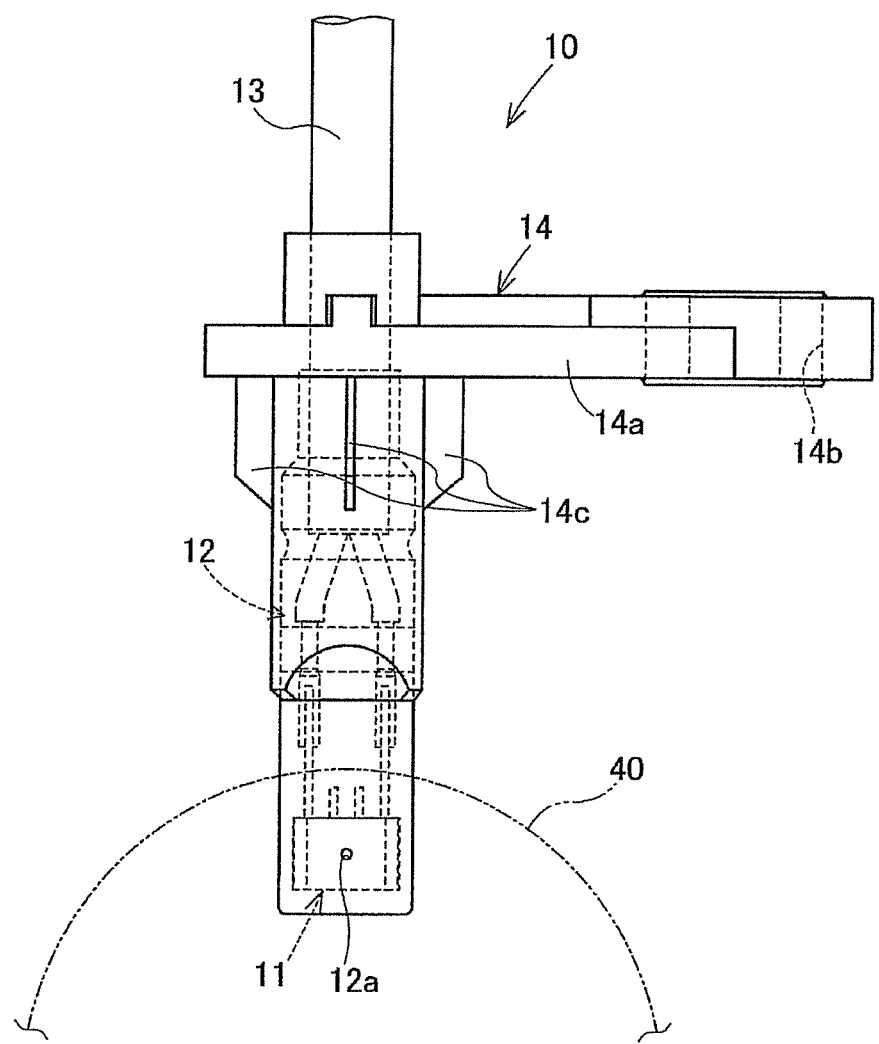
FIG. 9 is a side view schematically illustrating a configuration of a rotation detecting unit in accordance with a modification.

In the first embodiment, the attachment part main body 14*a* of the attachment part 14 is formed to extend in a direction intersecting with (perpendicular to) the surface of the rotatable body 40 (see FIG. 7A). Instead of this mode, as illustrated in FIG. 9, the attachment part main body 14*a* may be formed to extend in a direction parallel to the surface of the rotatable body 40 (including "non-parallel" which does not interfere with the rotatable body 40). In other words, similar to the attachment part 14 illustrated in FIG. 8, the attachment part 14 of the first embodiment is formed. Depending on the position of the attached body, the attachment part main body 14*a* may be formed to extend with an angle $\theta$ ($0°<\theta<180°$) relative to the surface of the rotatable body 40. By any configuration, only the configuration of the attachment part 14 is different. Accordingly, similar operation and its effects to the first embodiment can be obtained.

In the first and second embodiments, the sensor element 11*a* is provided in the rotation detecting part 11 (see FIGS. 2A and 2B). Instead of this mode, the sensor element 11*a* may be provided separately from the rotation detecting part 11. In this case, a signal line (including a lead frame) for transmitting the signal detected by the sensor element 11*a* to the rotation detecting part 11 (particularly the processing circuit body 11*c*) becomes necessary. In the main body part molding process, it is necessary to integrally mold the sensor element 11*a* from thermosetting resin together with the rotation detecting part 11, the joined part 15, and the signal transmission member 13, to form the main body part 12. Due to only a difference between integration of the sensor element 11*a* and the rotation detecting part 11 and their separation from each other, similar operation and its effects to the first and second embodiments can be obtained.

In the first and second embodiments, the holding member group 20 (holding members 21, 22, 23, 24) is used for holding the rotation detecting part 11 (see FIGS. 1 and 5A to 5D). Instead of this mode, one holding member or more of the holding members that constitute the holding member group 20 may have a different shape from the other holding member(s). For example, this may be a mode to employ one or more of the holding member 21B in FIG. 5B, the holding member 21C in FIG. 5C, and the holding member 21D illustrated in FIG. 5D in addition to the holding member 21A in FIG. 5A. Moreover, a mode to freely combine the holding members 21A, 21B, 21O, 21D may be employed. In any mode, the rotation detecting part 11 is held reliably at the time of integral moulding. Accordingly, the accuracy of the position of the detecting part 11 in the main body part 12 can be secured.

In the first and second embodiments, the semiconductor chip including the circuit which processes the signal detected by the sensor element 11a is used for the processing circuit body 11c (see FIGS. 2A and 2B). Instead of this mode, a configuration using a semiconductor device such as IC or large-scale integration (LSI), or a configuration using a substrate that packages a circuit component such as a semiconductor device, circuit element, or component for connection may be employed. As long as it has the function to process the signal detected by the sensor element 11a with only a difference in the configuration of the processing circuit body 11c, the circuit body 11c can produce similar operation and its effects to the first and second embodiments.

In the first and second embodiments, epoxy resin (EP) is used for thermosetting resin, and polybutylene terephthalate (PBT) is used as thermoplastic resin to form the unit 10 (see FIGS. 6A to 8). Instead of this mode, the unit 10 may be formed using another resin. For example, phenol resin (PF), melamine resin (MF), urea resin (UF), unsaturated polyester resin (UP), alkyd resin, polyurethane (PUR), or thermosetting polyimide (PI) may be used as thermosetting resin. For thermoplastic resin, polyethylene (PE), high density polyethylene (HDPE), medium density polyethylene (MDPE), low density polyethylene (LDPE), polypropylene (PP), polyvinyl chloride (PVC), polyvinylidene chloride, polystyrene (PS), poly vinyl acetate (PVAc), polytetrafluoroethylene (PTFE), acrylonitrile butadiene styrene (ABS) resin, AS resin, acrylic resin (PMMA), polyamide (PA), nylon, polyacetal (POM), polycarbonate (PC), modified polyphenylene ether (m-PPE, modified PPE, PPO), polyethylene terephthalate (PET), glass fiber reinforced polyethylene terephthalate (GF-PET), cyclic polyolefin (COP), polyphenylenesulfide (PPS), polysulfone (PSF), polyethersulfone (PES), amorphous polyarylate (PAR), liquid crystal polymer (LCP), polyether ether ketone (PEEK), thermoplastic polyimide (PI), or polyamidoimide (PAI), for example, may be used. Instead of (or using in combination with) thermoplastic resin or thermosetting resin, fiber reinforced plastics such as fibrous glass reinforced plastics (GFRP) or carbon fiber reinforced plastics (CFRP) may be employed.

To sum up, the rotation detecting unit 10 and the method for making the rotation detecting unit 10 in accordance with the above embodiments can be described as follows.

A rotation detecting unit 10 is adapted for a rotatable body 40. The rotation detecting unit 10 includes a rotation detecting part 11, a signal transmission member 13, and a main body part 12. The rotation detecting part 11 is configured to detect a rotational state of the rotatable body 40 and to output a rotation detection signal. The signal transmission member 13 is electrically connected to the rotation detecting part 11 to transmit the rotation detection signal to an external device. The main body part 12 holds at least a part of the signal transmission member 13 and the rotation detecting part 11. The main body part 12 is integrally molded from thermosetting resin including a joined part 15 obtained as a result of joining together a lead frame 11b of the rotation detecting part 11 and the signal transmission member 13, the part of the signal transmission member 13, and the rotation detecting part 11. The main body part 12 includes a recess 12a at a region corresponding to the rotation detecting part 11.

As a result of this configuration, integral moulding is performed using thermosetting resin with at least a part of the signal transmission member 13 and the rotation detecting part 11 included in the integral moulding without forming or a holder. Accordingly, the size of the entire rotation detecting unit 10 (particularly, the main body part 12) can be limited to be comparatively small. The thermosetting resin has adhesive property. Accordingly, adhesive joining with the signal transmission member 13 and the rotation detecting part 11 (including the lead frame 11b and so forth, the same will apply hereinafter) can reliably be carried out, and sealing properties can become securable. The recesses 12a formed at the main body part 12 are vestiges of the holding members 21, 22, 23, 24 that hold the rotation detecting part 11 (including supporting and positioning of the detecting part 11, the same will apply hereinafter) at the time of integral moulding using thermosetting resin. In other words, because the rotation detecting part 11 is held by the holding members 21, 22, 23, 24 at the time of integral moulding, the accuracy of the position of the detecting part 11 in the main body part 12 can be secured.

The "rotatable body 40" may be employed regardless of its shape. Normally, a disk shape (circular disk shape) or annular shape (doughnut shape), for example, may be used for the rotatable body 40. The "rotational state" is a state regarding a rotation such as a rotational speed or rotation angle, and may include a stop (stillness). The "rotation detecting part 11" includes at least the sensor element 11a and the signal processing component. The sensor element 11a and the signal processing component may be molded integrally with each other, or separately from each other. The sensor element 11a is arbitrary as long as it is an element which detects rotation of the rotatable body 40. Normally, a magnetometric sensor or sound-wave sensor, for example, may be used for the element 11a. The signal processing component has a function of performing the processing to output as the rotation detection signal in a signal format required (e.g., pulse signal, digital data signal, analog signal) based on the signal detected by the sensor element 11a. The "signal transmission member 13" is arbitrary as long, as it is a member which can transmit the rotation detection signal. A wire, an electric wire (including a shielding wire, the same will apply hereinafter) or an optical cable, for example, may be used for the member 13. The "lead frame 11b" is provided for the rotation detecting part 11, and may be arbitrary as long as it is a conductive member that can make an electrical connection. The lead frame 11b may be employed regardless of its shape, quantity, material and so forth. Moreover, not only the mode in which the lead frame 11b projects from the rotation detecting part 11, but also the mode in which the lead frame 11b is exposed to the surface of the rotation detecting part 11 may be applicable to the lead frame 11b. A lead wire, contact pin, or terminal, which is a conductive member equivalent to the lead frame 11b, for example, may also be employed. The "thermosetting resin" is arbitrary as long as it is resin that causes polymerization due to heating to form a network structure of high polymer and does not restore to its former state after curing. For example, epoxy resin (EP), phenol resin (PF), melamine resin (MF), urea resin (UF), unsaturated polyester resin (UP), alkyd resin, polyurethane (PUR), or thermosetting polyimide (PI) may be used for the thermosetting resin. In place of the thermosetting resin, fiber reinforced plastics such as fibrous glass reinforced plastics (GFRP) or carbon fiber reinforced plastics (CFRP) may be employed.

A surface of the rotation detecting part 11 may be exposed to the recess 12a, or the thermosetting resin may exist between the recess 12a and the surface of the rotation detecting part 11. As a result of this configuration, depending on a relationship among a hardness of the surface of the rotation detecting part 11, a pressure applied to the surface of the rotation detecting part 11 by the holding members 21, 22, 23, 24, and a pressure of thermosetting resin injected at the time of integral moulding, the surface of the rotation detecting part 11 is exposed to the recess 12a, or thermosetting resin is formed on the recess 12a. In any case, because of the adhesive strength of thermosetting resin, sealing properties of the signal transmission member 13 and the rotation detecting part 11 are securable.

The recess 12a may be formed to range across at least two sides of a surface of the rotation detecting part 11. As described above, the recess 12a is a vestige of the holding member 21, 22, 23, 24 that holds the rotation detecting part 11 at the time of integral moulding using thermosetting resin. As a result of this configuration, one holding member holds the rotation detecting part 11 from at least two directions. Accordingly, the accuracy of the position of the detecting part 11 in the main body part 12 can be secured by the simple configuration.

The recess 12a may be formed in the region of the main body part 12 corresponding to the rotation detecting part 11 away from the rotatable body 40. As a result of this configuration, the recess 12a formed at the main body part 12 is formed at the position away from the rotatable body 40. The main body part 12 on the recess 12a-side is formed to be thicker than a thickness of the main body part 12 near the rotatable body 40. Accordingly, physical characteristics (particularly rigidity) that are necessary for the main body part 12 can be ensured.

The rotation detecting part 11 may include: a sensor element 11a that is configured to detect the rotational state of the rotatable body 40; and a signal processing component that is configured to process a signal detected by the sensor element 11a and to output the rotation detection signal. The signal processing component may include: a processing circuit body 11c in which a circuit configured to process the signal detected by the sensor element 11a is formed; and a sealing body 11d that seals the processing circuit body 11c. The main body part 12 may be molded integrally with the sealing body 11d so as to hold the processing circuit body 11c. As a result of this configuration, because the processing circuit body 11c is molded integrally with the sealing body 11d, accuracy of the position of the signal processing component having the circuit body 11c can be ensured, and sealing properties of the component can be improved.

The "processing circuit body" may be used regardless of its configuration as long as a circuit which can process the rotation detection signal is formed. For example, a semiconductor chip, a semiconductor device (including an integrated circuit such as IC or LSI), or a board on which the semiconductor device, circuit component and so forth are arranged (specifically, printed circuit board or the like) may be used for the processing circuit body. The "circuit component" may include a component for connection such as a jumper wire or lead frame as well as a circuit element such as a resistor, capacitor, coil, or transformer.

The rotation detecting unit 10 may further include an attachment part 14 for attachment of the main body part 12 to an attached body. As a result of this configuration, the main body part 12 (eventually, the rotation detecting unit 10) can be easily attached to the attached body (e.g., frame). The "attachment part 14" is referred to also as a "stay", and may be used irrespective of its material, shape or the like. The material of the attachment part 14 may be thermoplastic resin, or may alternatively be similarly to the main body part 12, thermosetting resin. Furthermore, a material other than resin (e.g., metal or carbon fiber) may be used for the attachment part 14.

The attachment part 14 may be integrally molded from thermoplastic resin to cover one or both of a part of the main body part 12 and a part of the signal transmission member 13. As a result of this configuration, the integral moulding is performed using thermoplastic resin so that the attachment part 14 can easily be molded into the intended shape.

The "thermoplastic resin" is arbitrary as long as it is a resin that becomes flexible by heating to a glass transition temperature or melting point and is molded into its intended shape by subsequent cooling. For example, commodity plastics, engineering plastic, or superengineering plastic may be used for the thermoplastic resin. The commodity plastics may include, for example, polyethylene (PE), high density polyethylene (HDPE), medium density polyethylene (MDPE), low density polyethylene (LDPE), polypropylene (PP), polyvinyl chloride (PVC), polyvinylidene chloride, polystyrene (PS), poly vinyl acetate (PVAc), polytetrafluoroethylene (PTFE), acrylonitrile butadiene styrene (ABS) resin, AS resin, or acrylic resin (PMMA). The engineering plastic may include polybutylene terephthalate (PBT), polyamide (PA), nylon, polyacetal (POM), polycarbonate (PC), modified polyphenylene ether (m-PPE, modified PE, PPO), polyethylene terephthalate (PET), glass fiber reinforced polyethylene terephthalate (GF-PET), or cyclic polyolefin (COP). The superengineering plastic may include polyphenylenesulfide (PPS), polysulfone (PSF), polyethersulfone (PES), amorphous polyarylate (PAR), liquid crystal polymer (LCP), polyether ether ketone (PEEK), thermoplastic polyimide (PI), or polyamidoimide (PAI). Instead of (or using in combination with) thermoplastic resin, the fiber reinforced plastics may be used.

A cross-sectional surface of a region of the main body part 12 with which the attachment part 14 is integrally molded may be partly or entirely formed in one of a circle and ellipse. The "cross-sectional surface" means, a cross-sectional shape of an outer peripheral surface. As a result of this configuration, in the case of forming a part or all of the cross-section of the main body part 12 into a circle (including a circle having depression and projections in a permissible range on its surface, as well as a true circle, the same will apply hereinafter), the main body part 12 can be formed evenly in all directions. In the case of forming of a part or all of the cross-section into Ellipse (including an ellipse having depression and projections in a permissible range on its surface, the same will apply hereinafter), a function of preventing the rotation of the main body part 12 can be obtained.

A method is for making a rotation detecting unit 10. The rotation detecting unit 10 includes a rotation detecting part 11, a signal transmission member 13, a main body part 12, and an attachment part 14. The rotation detecting part 11 is configured to detect a rotational state of a rotatable body 40 and to output a rotation detection signal. The signal transmission member 13 is electrically connected to the rotation detecting part 11 to transmit the rotation detection signal to an external device. The main body part 12 holds at least a part of the signal transmission member 13 and the rotation detecting part 11. The attachment part 14 is for attachment of the main body part 12 to an attached body. According to the method, a joining process is performed. In the joining process, a lead frame 11b of the rotation detecting part 11 and the signal transmission member 13 are joined together. Furthermore, a main body part molding process is performed. In the main body part molding process, at least a joined part 15, at which the lead frame 11b and the signal transmission member 13 are joined together in the joining process, the part of the signal transmission member 13, and the rotation, detecting part 11 are integrally-molded from thermosetting resin, thereby to form the main body part 12.

As a result of this configuration, integral moulding is performed using thermosetting resin with at least a part of the signal transmission member 13 and the rotation detecting part 11 included in the integral moulding by only performing the joining process and main body part molding process without forming or a holder. Accordingly, the size of the entire rotation detecting unit 10 (particularly, the main body part 12) can be limited to be comparatively small. The thermosetting resin has, adhesive property. Accordingly, adhesive joining with the signal transmission member 13 and the rotation detecting part 11 can reliably be carried out. The recess 12a formed at the main body part 12 is a vestige of the holding member 21, 22, 23, 24 that holds the rotation detecting part 11 at the time of integral moulding using thermosetting resin. In other words, because the rotation detecting part 11 is held by the holding member 21, 22, 23, 24 at the time of integral moulding, the accuracy of the position of the detecting part 11 in the main body part 12 can be secured.

According to the method, an attachment part molding process is further performed. In the attachment part forming process, the attachment part 14 is formed through its integral formation from thermoplastic resin to cover one or both of a part of the main body part 12 and a part of the signal transmission member 13. As a result of this configuration, only by further performing the attachment part molding process, the rotation detecting unit 10 which has the attachment part, 14 can be produced.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A rotation detecting unit adapted for a rotatable body, comprising:
   a rotation detecting part that is configured to detect a rotational state of the rotatable body and to output a rotation detection signal;
   a signal transmission member that is electrically connected to the rotation detecting part to transmit the rotation detection signal to an external device; and
   a main body part that holds at least a part of the signal transmission member and the rotation detecting part, wherein:
      the main body part is integrally molded from thermosetting resin including a joined part obtained as a result of joining together a terminal of the rotation detecting part and the signal transmission member, the part of the signal transmission member, and the rotation detecting part;
      the main body part includes a recess at a region corresponding to the rotation detecting part; and
      the recess is formed to range across at least two sides of the rotation detecting part including a surface opposed to a detection surface of the rotation detecting part.

2. The rotation detecting unit according to claim 1, wherein a surface of the rotation detecting part is exposed to the recess, or the thermosetting resin exists between the recess and the surface of the rotation detecting part.

3. The rotation detecting unit according to claim 1, wherein the recess is formed to range across at least two sides of a surface of the rotation detecting part.

4. The rotation detecting unit according to claim 1, wherein the recess is formed in the region of the main body part corresponding to the rotation detecting part away from the rotatable body.

5. The rotation detecting unit according to claim 1, wherein:
   the rotation detecting part includes:
      a sensor element that is configured to detect the rotational state of the rotatable body; and
      a signal processing component that is configured to process a signal detected by the sensor element and to output the rotation detection signal and that includes:
         a processing circuit body in which a circuit configured to process the signal detected by the sensor element is formed; and
         a sealing body that seals the processing circuit body; and
   the main body part is molded integrally with the sealing body so as to hold the processing circuit body.

6. The rotation detecting unit according to claim 1, further comprising an attachment part for attachment of the main body part to an attached body.

7. The rotation detecting unit according to claim 6, wherein the attachment part is integrally molded from thermoplastic resin to cover one or both of a part of the main body part and a part of the signal transmission member.

8. The rotation detecting unit according to claim 6, wherein a cross-sectional surface of a region of the main body part with which the attachment part is integrally molded is partly or entirely formed in one of a circle and ellipse.

9. The rotation detecting unit according to claim 1, wherein the at least two sides of the rotational detecting part are perpendicular to each other.

10. A rotation detecting unit adapted for a rotatable body, comprising:
    a rotation detecting part that is configured to detect a rotational state of the rotatable body and to output a rotation detection signal;
    a signal transmission member that is electrically connected to the rotation detecting part to transmit the rotation detection signal to an external device; and
    a main body part that holds at least a part of the signal transmission member and the rotation detecting part, wherein:
       the main body part is integrally molded from thermosetting resin including a joined part obtained as a result of joining together a terminal of the rotation detecting part and the signal transmission member, the part of the signal transmission member, and the rotation detecting part;
       the main body part includes a recess at a region corresponding to the rotation detecting part;
       the recess is open to a surface of the rotation detecting part; and the recess is formed to range across at least two sides of the rotation detecting part including a surface opposed to a detection surface of the rotation detecting part.

11. A method for making a rotation detecting unit including:
- a rotation detecting part that is configured to detect a rotational state of a rotatable body and to output a rotation detection signal;
- a signal transmission member that is electrically connected to the rotation detecting part to transmit the rotation detection signal to an external device;
- a main body part that holds at least a part of the signal transmission member and the rotation detecting part; and
- an attachment part for attachment of the main body part to an attached body, the method comprising:
- performing a joining process, wherein the performing of the joining process includes joining together a terminal of the rotation detecting part and the signal transmission member;
- performing a main body part molding process, wherein the performing of the main body part molding process includes integrally-molding at least a joined part, at which the terminal and the signal transmission member are joined together in the joining process, the part of the signal transmission member, and the rotation detecting part from thermosetting resin, thereby to form the main body part; and
- forming a recess across at least two sides of the rotation detecting part including a surface opposed to a detection surface of the rotation detecting part.

12. The rotation detecting unit according to claim 11, wherein the recess is formed to range across at least two sides of the rotation detecting part including a surface opposed to a detection surface of the rotation detecting part.

13. The rotation detecting unit according to claim 11, wherein the at least two sides of the rotational detecting part are perpendicular to each other.

14. The method according to claim 11, further comprising performing an attachment part molding process, wherein the performing of the attachment part molding process includes forming the attachment part through its integral molding from thermoplastic resin to cover one or both of a part of the main body part and a part of the signal transmission member.

* * * * *